(12) United States Patent
Hamada et al.

(10) Patent No.: US 11,904,562 B2
(45) Date of Patent: Feb. 20, 2024

(54) TIRE VULCANIZATION MOLD, PRODUCTION METHOD FOR TIRE, AND TIRE

(71) Applicant: Sumitomo Rubber Industries, Ltd., Kobe (JP)

(72) Inventors: Tomohiro Hamada, Kobe (JP); Takayuki Wada, Kobe (JP); Mai Ito, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 0 days.

(21) Appl. No.: 17/872,034

(22) Filed: Jul. 25, 2022

(65) Prior Publication Data
US 2023/0063536 A1  Mar. 2, 2023

(30) Foreign Application Priority Data

Aug. 26, 2021 (JP) ................. 2021-138201

(51) Int. Cl.
*B29D 30/00* (2006.01)
*B29D 30/06* (2006.01)

(52) U.S. Cl.
CPC ..... *B29D 30/0606* (2013.01); *B29D 30/0633* (2013.01); *B29D 2030/0612* (2013.01); *B29D 2030/0616* (2013.01)

(58) Field of Classification Search
None
See application file for complete search history.

(56) References Cited

U.S. PATENT DOCUMENTS

| 2017/0157995 A1* | 6/2017 | Muhlhoff | ................. B44C 1/00 |
| 2020/0026251 A1* | 8/2020 | Sakaguchi | ............ B60C 13/001 |

FOREIGN PATENT DOCUMENTS

| DE | 102014215094 A1 * | 2/2016 | ............. B60C 13/02 |
| JP | 2020-29209 A | 2/2020 | |
| WO | WO2015078882 A1 * | 6/2015 | ............. B60C 13/02 |

OTHER PUBLICATIONS

Muhlhoff WO2015078882A1 English Translation 2015 (Year: 2015).*
Bogenschutz DE102014215094A1 English Translation 2016 (Year: 2016).*

* cited by examiner

*Primary Examiner* — Jacob T Minskey
*Assistant Examiner* — Adrien J Bernard
(74) *Attorney, Agent, or Firm* — Patrick L. Miller (57) ABSTRACT

A tire vulcanization mold includes a molding surface for molding a tire during vulcanization molding. The molding surface can include a first region in which a plurality of recesses for forming a plurality of projections on a surface of the tire can be provided. In the first region, at least two of the recesses can be arranged per $mm^2$. Each of the recesses can include a side wall surface, a bottom surface, and a virtual recess central axis extending in a depth direction of the recess. In a cross-sectional view of the recess including the recess central axis, the bottom surface can include a bottom projection projecting outward in the depth direction, and the side wall surface can include an arc-shaped surface smoothly connected to the bottom surface.

14 Claims, 11 Drawing Sheets

TIRE VULCANIZATION MOLD, PRODUCTION METHOD FOR TIRE, AND TIRE

CROSS-REFERENCE TO RELATED APPLICATION

This application claims priority to and the benefit of Patent Application No. 2021-138201 filed in JAPAN on Aug. 26, 2021. The entire content and disclosure of which are hereby incorporated by reference.

BACKGROUND

Field

The present disclosure relates to a tire vulcanization mold, a production method for a tire, and a tire.

Background Art

Japanese Laid-Open Patent Publication No. 2020-29209 describes a tire having a decorative portion at a part of the outer surface thereof, and the decorative portion has a plurality of micro projections arranged therein. The micro projections can reduce reflection of light on the decorative portion, thereby increasing the degree of blackness of the decorative portion. Therefore, the contrast in brightness between the decorative portion and a non-decorative portion adjacent thereto can be enhanced. Accordingly, the visibility of the outer surface of the tire can be improved.

A tire vulcanization mold for forming the above decorative portion includes a plurality of minute recesses corresponding to the micro projections. In such a tire vulcanization mold, fine pieces of rubber, dust, and the like are likely to be accumulated in the recesses as tire molding is performed repeatedly. Therefore, there has been a need to increase the frequency of cleaning of the mold in order to perform tire molding with the degree of blackness of the decorative portion maintained at an appropriate level.

The present invention has been made in view of the above circumstances, and a major object of the present disclosure is to provide: a tire vulcanization mold and a production method for a tire in which dirt is less likely to be accumulated in recesses provided in a molding surface.

SUMMARY

The present disclosure is directed to a tire vulcanization mold including a molding surface for molding a tire during vulcanization molding. The molding surface includes a first region in which a plurality of recesses for forming a plurality of projections on a surface of the tire are provided. In the first region, at least two of the recesses are arranged per $mm^2$. Each of the recesses includes a side wall surface, a bottom surface, and a virtual recess central axis extending in a depth direction of the recess. In a cross-sectional view of the recess including the recess central axis, the bottom surface includes a bottom projection that projects outward in the depth direction. The side wall surface includes an arc-shaped surface that is smoothly connected to the bottom surface.

In the tire vulcanization mold according to the present disclosure, dirt is less likely to be accumulated in the recesses. Therefore, an increase in the frequency of cleaning of the mold can be suppressed.

DETAILED DESCRIPTION

Figure 1:
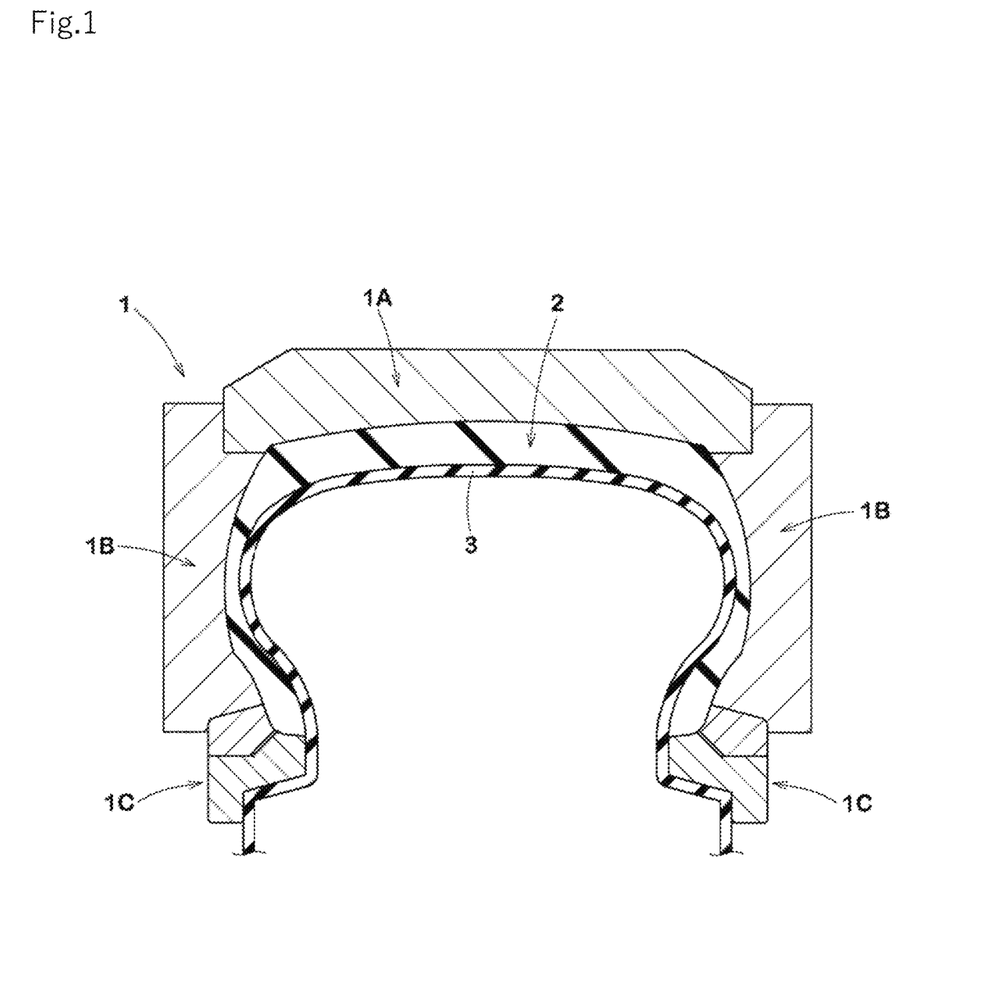
FIG. 1 is a cross-sectional view of a tire vulcanization mold according to an embodiment.

An embodiment of the present disclosure will be described below with reference to the accompanying drawings. FIG. 1 is a cross-sectional view of a tire vulcanization mold 1 according to the present embodiment (also simply referred to as a "mold"). As shown in FIG. 1, the tire vulcanization mold 1 according to the present embodiment has a molding surface for forming an outer surface of an unvulcanized green tire 2. The green tire 2 is pressed from the inside against the molding surface of the tire vulcanization mold 1 by an expanded bladder 3 while being heated in the tire vulcanization mold 1. Accordingly, the green tire 2 is vulcanized and molded to obtain a tire.

Figure 2:
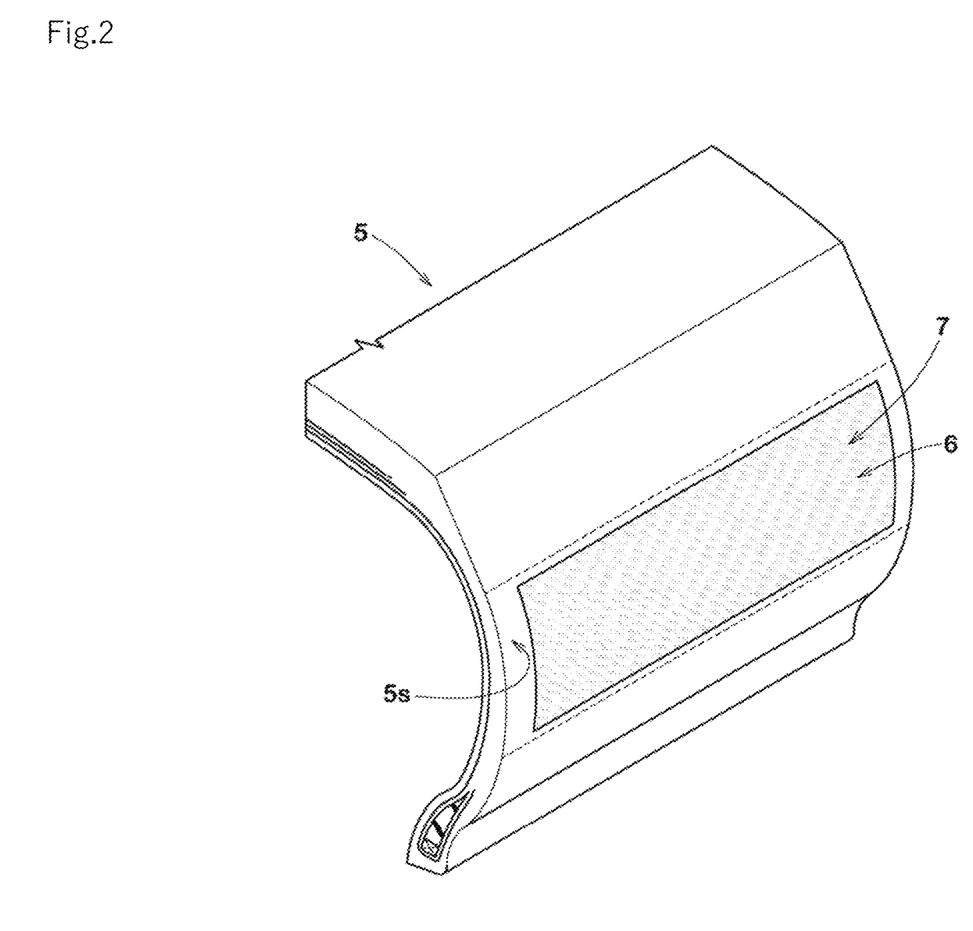
FIG. 2 is a partial perspective view showing an example of a tire vulcanized and molded using a tire vulcanization mold according to the present disclosure.

FIG. 2 is a perspective view showing an example of a tire 5 vulcanized and molded using the tire vulcanization mold 1 according to the present disclosure. Although the tire 5 in FIG. 2 is for a passenger car, the tire vulcanization mold 1 according to the present disclosure is not limited to such a mode. The tire vulcanization mold 1 according to the present disclosure may be used for vulcanizing and molding a motorcycle tire or heavy-duty tire, for example.

As shown in FIG. 2, the tire 5 has a visible outer surface 5s. The visible outer surface 5s is a surface that can be seen from the outside when the tire 5 is mounted on a rim (not shown). The tire 5 has a decorative region 6 (marked by dots in FIG. 2) at a part of the outer surface 5s. The decorative region 6 is a region having a plurality of micro projections provided therein. For example, at least 2 micro projections, more particularly 2 to 10 micro projections, are disposed per $mm^2$ in the decorative region 6 of the present embodiment. Such micro projections can reduce reflection of light on the decorative region 6 to increase the degree of blackness of the decorative region 6, thereby serving to improve the appearance of the tire 5. The decorative region 6 of the present embodiment is, for example, provided at a sidewall portion 7.

As shown in FIG. 1, the tire vulcanization mold 1 according to the present embodiment includes a tread segment 1A, sidewall segments 1B, and bead rings 1C. In the present embodiment, a molding surface of the sidewall segment 1B can be used to form the decorative region 6 provided at the sidewall portion 7 of the tire 5.

Figure 3:
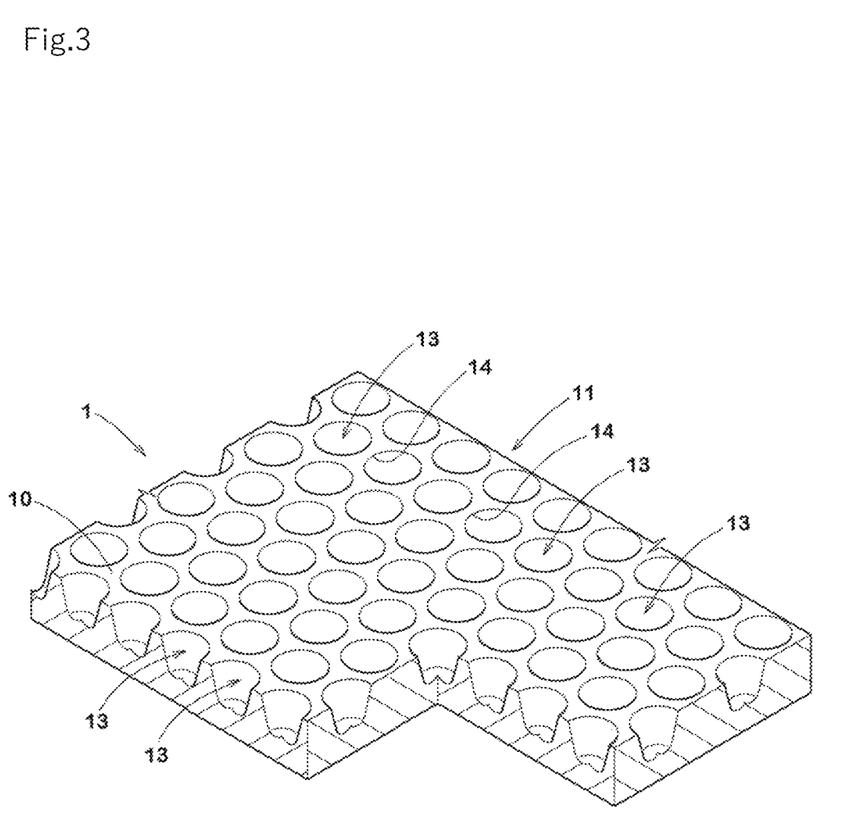
FIG. 3 is an enlarged perspective view of a molding surface of the tire vulcanization mold in FIG. 1.

FIG. 3 is an enlarged perspective view of a molding surface 10 of the tire vulcanization mold 1. The molding surface 10 of the tire vulcanization mold 1 includes a first region 11 in which a plurality of recesses 13 for forming a plurality of projections (micro projections) on the surface of a tire are provided. The tire 5 vulcanized and molded using the tire vulcanization mold 1 having the molding surface 10 has, on the outer surface thereof, a plurality of micro projections, each of which has a reverse shape of the recess 13, and thus, has the decorative region 6 (shown in FIG. 2).

In order to reliably reduce reflection of light on the decorative region 6, preferably, the micro projections in the decorative region 6 are sufficiently small micro projections. Thus, in the first region 11 of the molding surface 10, at least two recesses 13 are provided per $mm^2$. Specifically, in the first region 11, 2 to 10 recesses 13 are preferably provided per $mm^2$. The number of recesses 13 per $mm^2$ can be calculated by dividing the number of recesses 13 completely included in a plane that is in the shape of a square with a side of 5 mm by 25.

An end edge 14 which defines the recess 13 is preferably in the shape of a circle, for example. However, the present disclosure is not limited to such a mode. The end edge 14 of the recess 13 may have any of various shapes such as an ellipse, a rectangle, and a polygon.

Figure 4:
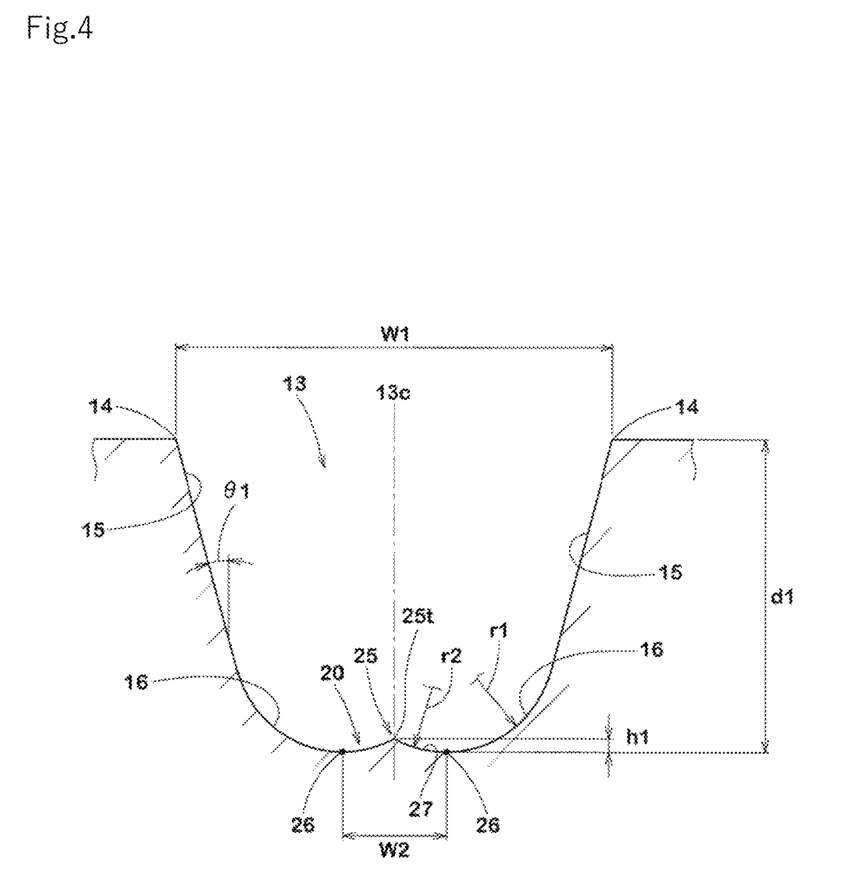
FIG. 4 is a cross-sectional view of a recess in FIG. 3.

FIG. 4 is a cross-sectional view of the recess 13. As shown in FIG. 4, each recess 13 includes a side wall surface 15, a bottom surface 20, and a virtual recess central axis 13c extending in the depth direction of the recess 13. The recess central axis 13c means a virtual line that passes through the centroid of a plane surrounded by the end edge 14 of the recess 13 and extends in the depth direction of the recess 13. In the present embodiment, the plane surrounded by the end edge 14 of the recess 13 is in the shape of a circle, through the center of which the recess central axis 13c passes.

In a cross-sectional view of the recess 13 including the recess central axis 13c, the bottom surface 20 includes a bottom projection 25 which projects outward in the depth direction. The side wall surface 15 includes an arc-shaped surface 16 that is smoothly connected to the bottom surface 20. Due to the abovementioned configuration, dirt is less likely to be accumulated in the recesses 13 of the tire vulcanization mold 1 according to the present disclosure. Therefore, an increase in the frequency of cleaning of the mold can be suppressed. This may be attributed to a mechanism described below.

In conventional tire vulcanization molds, recesses have a relatively flat inner surface, and a bottom surface and a side wall surface thereof are connected such that a ridge is formed therebetween. Therefore, during vulcanization molding, it is difficult to separate rubber from the inner surface of the recess, so that fine pieces of rubber or dust, an oil component released from rubber, and the like are likely to be accumulated in the recess.

In contrast to this, in the present disclosure, as described above, the bottom surface 20 of the recess 13 has the bottom projection 25, and the side wall surface 15 includes the arc-shaped surface 16. Therefore, when the mold is separated from a tire, the separation of the rubber begins from the bottom projection 25, and the rubber can be separated progressively from the bottom projection 25 along the side wall surface 15. In particular, the side wall surface 15 includes the arc-shaped surface 16, and therefore, tearing of the rubber during the progressive separation of the rubber can be effectively suppressed. It is inferred that such a mechanism can suppress accumulation of dirt in the recess.

A more detailed configuration of the present embodiment will be described below. It should be noted that each part described below illustrates a specific example of the present embodiment. Therefore, it is needless to say that the present disclosure can exhibit the abovementioned effect even in the case where parts described below are not included. In addition, even if any one of the parts described below is applied alone to the tire vulcanization mold according to the present disclosure having the abovementioned features, the performance of the tire vulcanization mold according to the present disclosure can be expected to be improved according to that part. Furthermore, if some of the parts described below are applied in combination, the performance of the tire vulcanization mold according to the present disclosure can be expected to be improved in a complex manner according to those parts.

An opening width W1 of the recess 13 is, for example, not greater than 0.5 mm and preferably 0.25 to 0.35 mm. A maximum depth d1 of the recess 13 is, for example, not greater than 0.5 mm and preferably 0.25 to 0.35 mm. However, the dimensions of the recess 13 are not limited to such a mode. Unless otherwise specified, the dimension of each portion of the recess 13 is a dimension measured when the tire vulcanization mold 1 is cooled to room temperature.

In the present embodiment, since the bottom surface 20 has the bottom projection 25, a portion where the recess 13 is deepest (hereinafter, sometimes referred to as a deepest portion 26) is provided around the bottom projection 25. In a plan view (not shown) of the recess 13, the deepest portion 26 has an annular shape, and the bottom surface 20 corresponds to a region surrounded by the annular deepest portion 26. In the cross-sectional view of the recess 13 shown in FIG. 4, the deepest portion 26 is substantially represented by a dot, and the bottom surface 20 is composed of the outer surface of the bottom projection 25. In addition, the arc-shaped surface 16 is connected to the deepest portion 26. In another embodiment, the deepest portion 26 may include a flat portion. That is, the deepest portion 26 may be composed of a flat portion provided between the side wall surface 15 and the bottom projection 25. In this case, the outer surface of the bottom projection 25 and the flat portion that is the deepest portion 26 constitute the bottom surface 20.

The side wall surface 15 extends from the end edge 14 of the recess 13 so as to be inclined, for example. An angle θ1 of the side wall surface 15 with respect to the depth direction of the recess 13 is, for example, 5 to 35° and preferably 10 to 20°. Therefore, reflection of light on the formed decorative region 6 is further suppressed.

From the viewpoint of exhibiting the abovementioned effect while ensuring a sufficient volume of the micro projection formed by the recess 13, the arc-shaped surface 16 of the side wall surface 15 has a radius of curvature r1 of not less than 0.070 mm and more preferably not less than 0.085 mm, and preferably not greater than 0.130 mm and more preferably not greater than 0.115 mm.

In the cross-sectional view, the bottom projection 25 includes a peak portion 25t that is located on the outermost side in the depth direction of the recess 13, and a bottom projection side wall surface 27 that extends from the peak portion 25t inward in the depth direction of the recess 13. The peak portion 25t of the present embodiment is, for example, disposed on the recess central axis 13c. The peak portion 25t of the present embodiment has a pointed shape that has substantially no flat surface. However, the peak portion 25t may include a small flat surface.

The bottom projection side wall surface 27 is preferably in the shape of an arc-shaped curve that is convex toward the recess central axis 13c. The arc-shaped curve has a radius of curvature r2 of not less than 0.070 mm and more preferably not less than 0.085 mm, and preferably not greater than 0.130 mm and more preferably not greater than 0.115 mm. In a more preferable mode, the radius of curvature r2 is equal to the radius of curvature r1 of the arc-shaped surface 16 of the side wall surface 15. As a result, in the cross-sectional view, the profiles of the arc-shaped surface 16 of the side wall surface 15 and the outer surface of the bottom projection 25 preferably form a single arc. Such a bottom projection side wall surface 27 can effectively suppress accumulation of dirt in the recess 13.

If the bottom projection 25 is small, there is a possibility that the abovementioned effect is not sufficiently obtained. On the other hand, if the bottom projection 25 is large, there is a possibility that the bottom projection 25 itself is chipped off. From such a viewpoint, a height h1 of the bottom projection 25 is, for example, not greater than 10% and preferably 1 to 5% of the depth d1 of the recess 13. Specifically, the height h1 of the bottom projection 25 is preferably not less than 0.050 mm and more preferably not less than 0.010 mm, and preferably not greater than 0.200 mm and more preferably not greater than 0.015 mm.

From the same viewpoint, a width W2 of the bottom projection 25 is preferably not less than 15% and more preferably not less than 20%, and preferably not greater than 35% and more preferably not greater than 30%, of the opening width W1 of the recess 13.

In a more preferable mode, each recess 13 preferably has a shape that is symmetric about the recess central axis 13c, as a result of having the abovementioned structure. Accordingly, accumulation of dirt in the recess 13 can be further suppressed.

Figure 5:
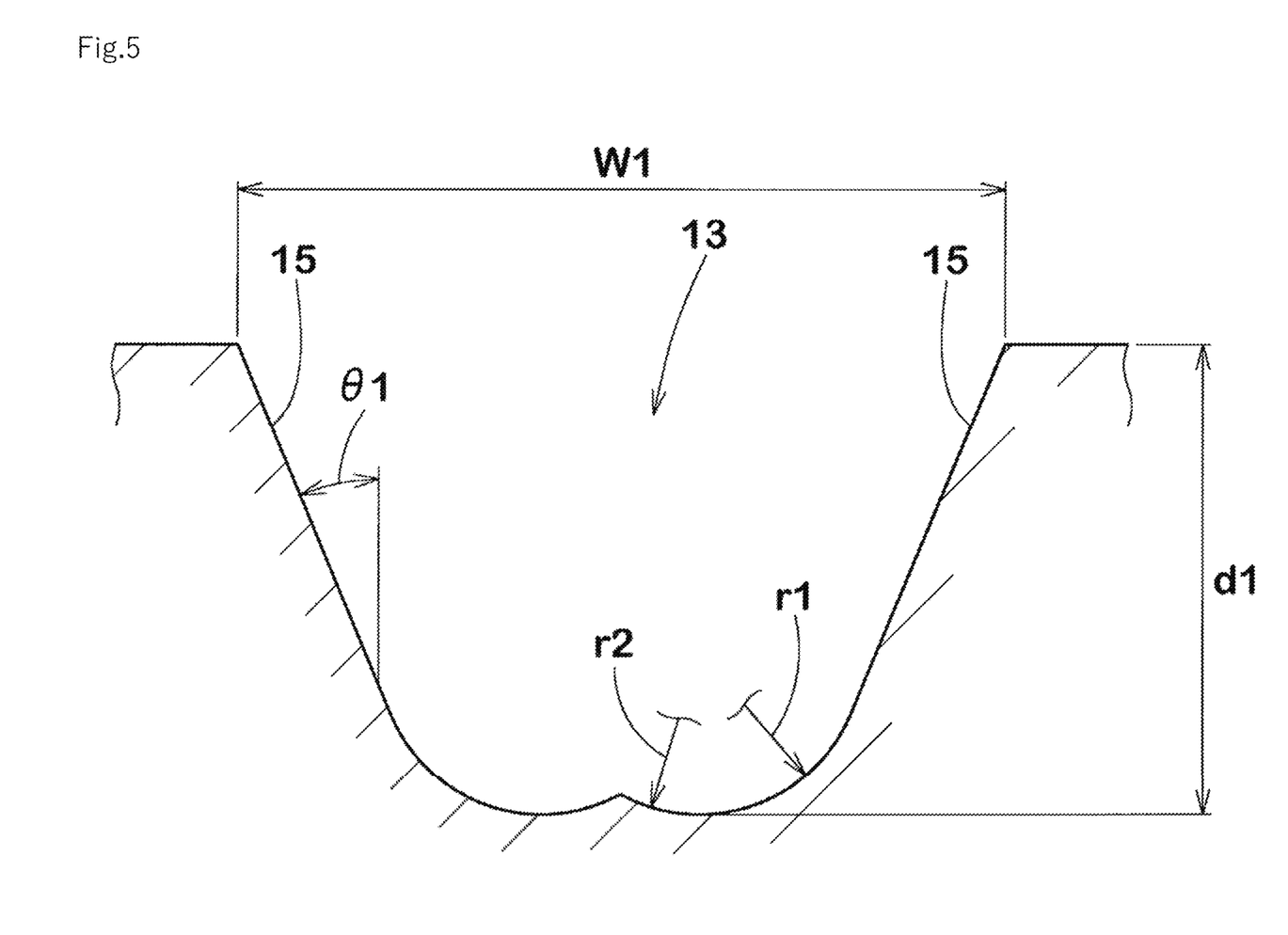
FIG. 5 is a cross-sectional view of a recess according to another embodiment of the present disclosure.
Figure 6:
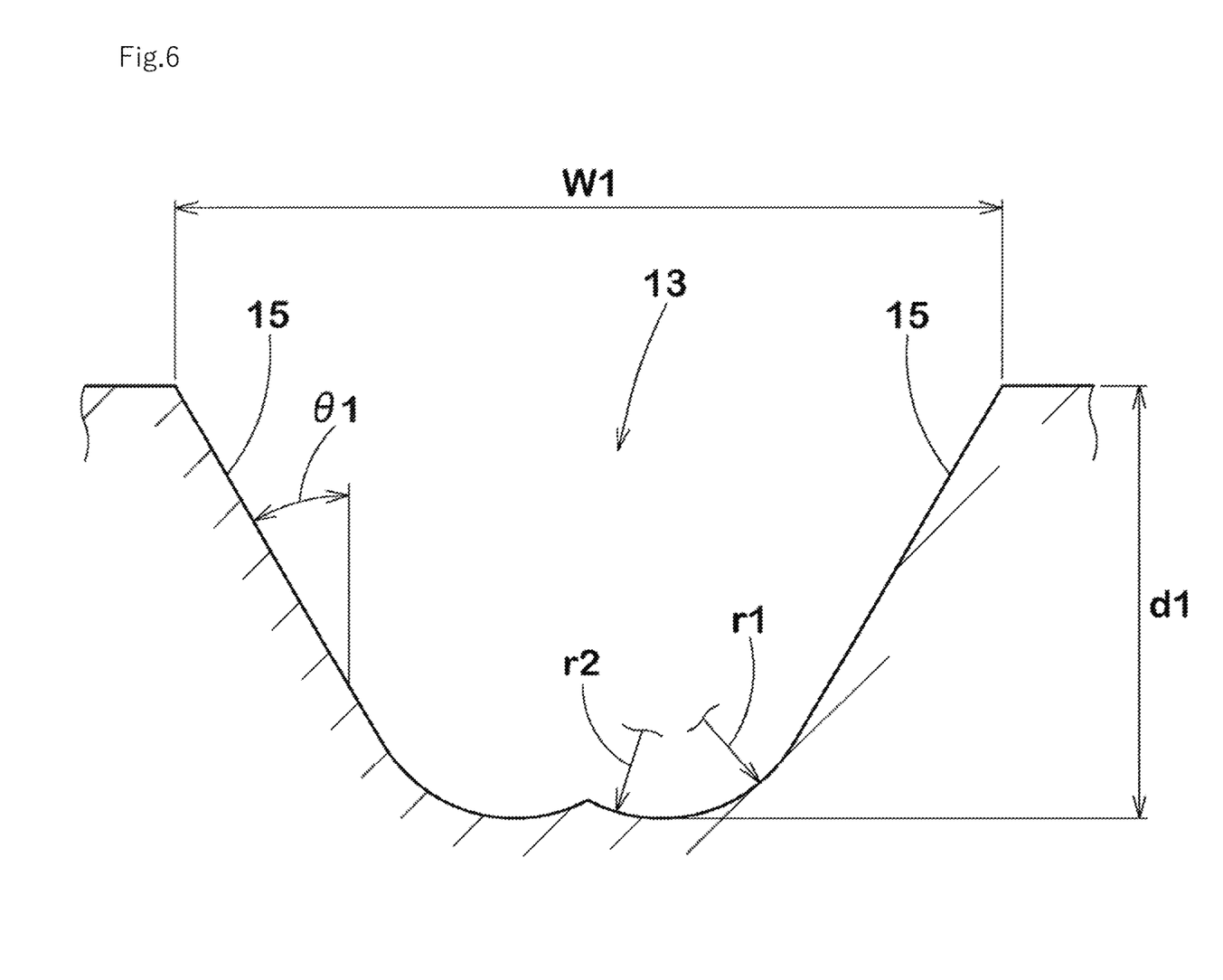
FIG. 6 is a cross-sectional view of a recess according to still another embodiment of the present disclosure.

FIGS. 5 and 6 are each a cross-sectional view of a recess 13 according to another embodiment of the present disclosure. In the embodiments shown in FIGS. 5 and 6, the angle θ1 of the side wall surface 15 of the recess 13 is set to be greater than that of the embodiment shown in FIG. 4. In the embodiment shown in FIG. 5, the angle θ1 is 22.5°, and the angle between the two side wall surfaces 15 in the cross-sectional view is 45°. In the embodiment shown in FIG. 6, the angle θ1 is 30°, and the angle between the two side wall surfaces 15 in the cross-sectional view is 60°. Even in such embodiments, accumulation of dirt in the recess 13 can be effectively suppressed.

Figure 7:
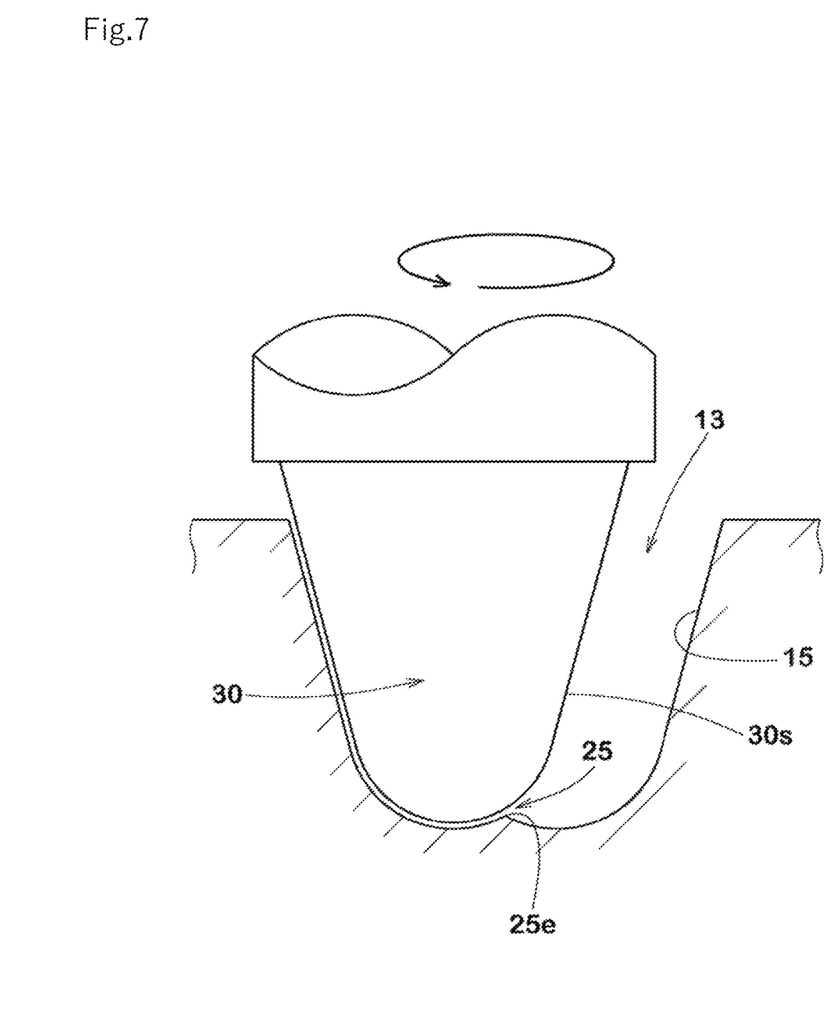
FIG. 7 is a cross-sectional view taken during formation of a recess on a molding surface of a vulcanization mold.

FIG. 7 is a cross-sectional view taken during formation of the recess 13 on the molding surface 10. As shown in FIG. 7, the recess 13 according to the present disclosure can be formed, for example, using a small drill 30 attached to a radial drilling machine. Specifically, the small drill 30 has a tip surface 30s corresponding to the side wall surface 15 of the recess 13, and is caused to revolve about the peak portion 25t of the bottom projection 25 to form the recess 13, so that the above-described recess 13 having the bottom projection 25 is obtained.

Figure 8:
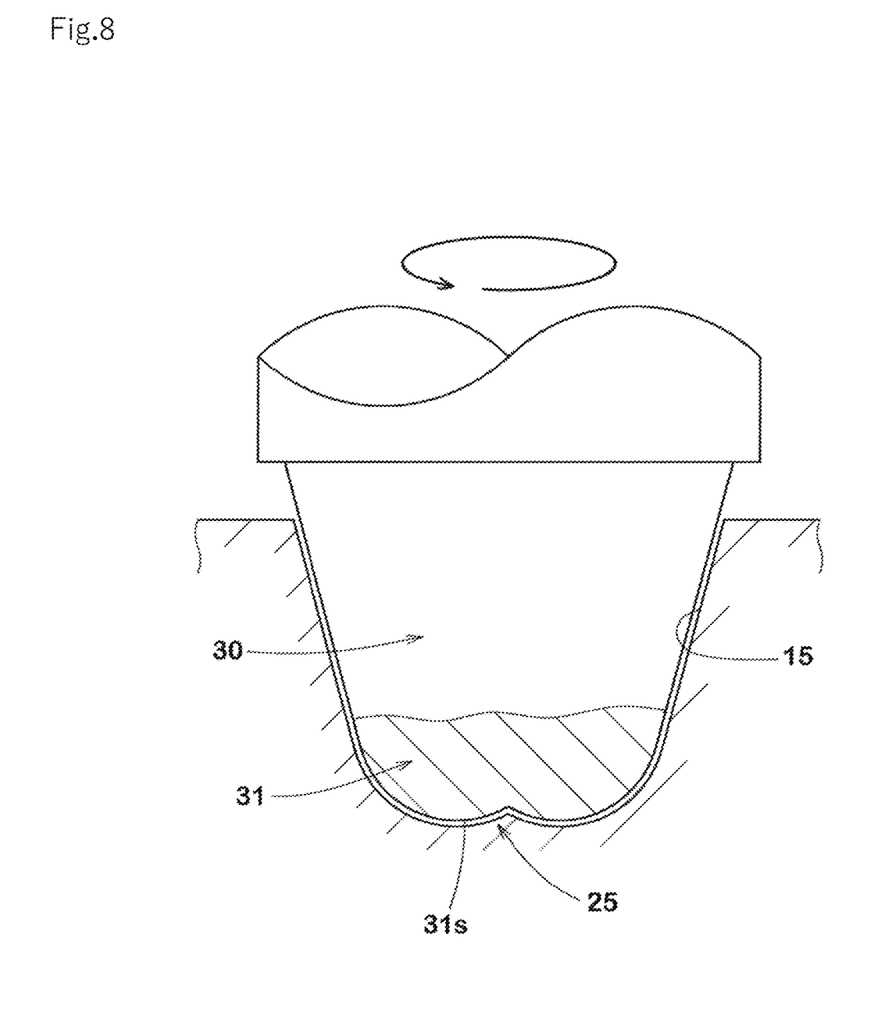
FIG. 8 is a cross-sectional view taken during formation of a recess on a molding surface of a vulcanization mold.

FIG. 8 is a cross-sectional view taken during formation of the recess 13 on the molding surface 10 in another embodiment different from that of FIG. 7. FIG. 8 illustrates a cross-sectional shape of a tip portion 31 of a small drill 30. As shown in FIG. 8, in the present embodiment, an outer surface 31s of the tip portion 31 of the small drill 30 has an indentation corresponding to the bottom projection 25. The recess 13 according to the present disclosure can be obtained by machining the molding surface 10 of the tire vulcanization mold 1 using such a small drill 30.

The tire vulcanization mold 1 according to the present disclosure is applied to a known production method for a tire. In a tire production method including the step of vulcanizing and molding a tire using the tire vulcanization mold 1 according to the present disclosure, dirt is less likely to be accumulated in the recesses 13 of the tire vulcanization mold 1, and therefore, an increase in the frequency of cleaning of the mold can be suppressed.

Figure 9:
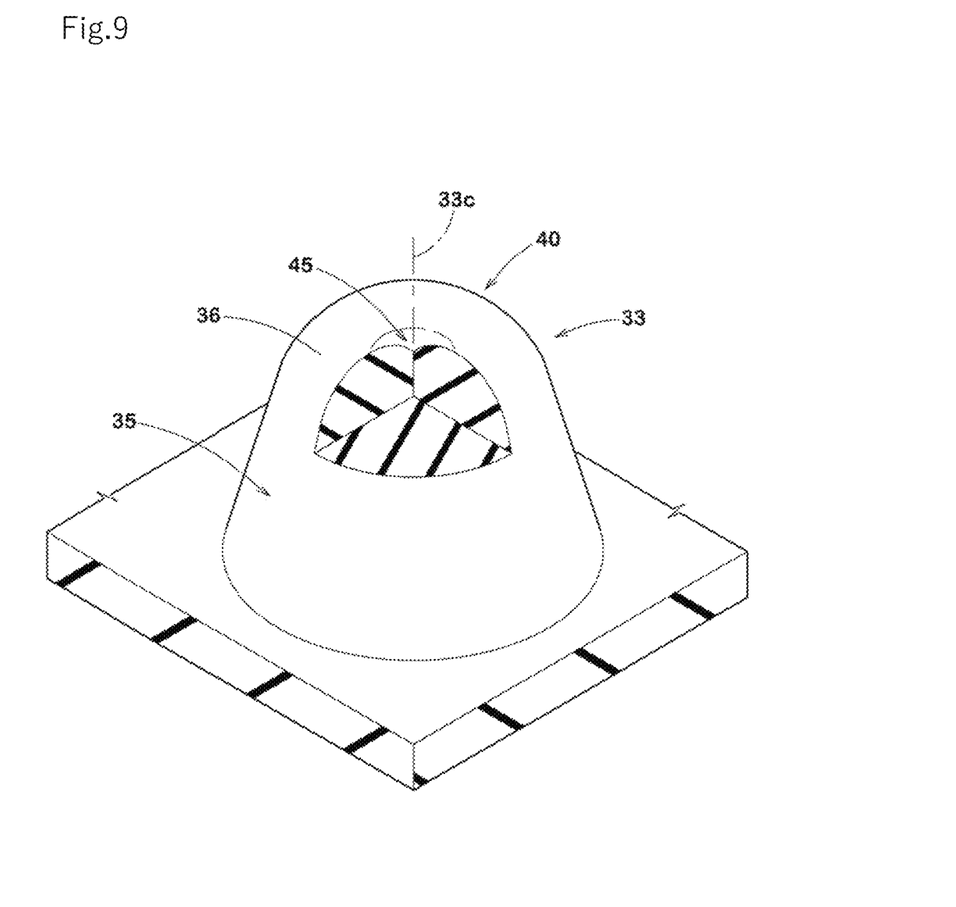
FIG. 9 is an enlarged perspective view of a micro projection formed by a recess of the tire vulcanization mold according to the present disclosure.

As shown in FIG. 2, a tire vulcanized and molded using the tire vulcanization mold 1 according to the present disclosure has a plurality of micro projections formed in the decorative region 6 so as to each have a reverse shape of the recess 13. FIG. 9 is an enlarged perspective view of one of micro projections 33 provided on the outer surface of a tire. As shown in FIG. 9, the micro projection 33 includes a side surface 35, a projection peak portion 40, and a virtual micro projection central axis 33c. The side surface 35 of the micro projection 33 has a shape corresponding to the side wall surface 15 of the recess 13. The projection peak portion 40 of the micro projection 33 has a shape corresponding to the bottom surface 20 of the recess 13.

In a cross-sectional view of the micro projection including the micro projection central axis 33c, the projection peak portion 40 includes a peak recess 45 that is recessed inward in the height direction of the micro projection 33. In addition, the side surface 35 of the micro projection 33 has an arc-shaped surface 36 that is smoothly connected to the projection peak portion 40. Such a micro projection 33 can further suppress reflection of light, thereby serving to improve the appearance of the tire.

Although the embodiments of the present disclosure have been described in detail above, the present disclosure is not limited to the illustrated embodiments, and various modifications can be made to practice the present disclosure.

EXAMPLES

In order to verify the effects of the present disclosure, tires were produced as examples using a tire vulcanization mold having recesses shown in FIGS. 4 to 6. As a comparative example, a tire was produced using a tire vulcanization mold having recesses a shown in FIG. 10. In each recess a of the comparative example, a side wall surface b and a bottom surface c are connected via a ridge d. The dimensions of the recesses of the comparative example and the examples are as follows.

Comparative Example

Figure 10:
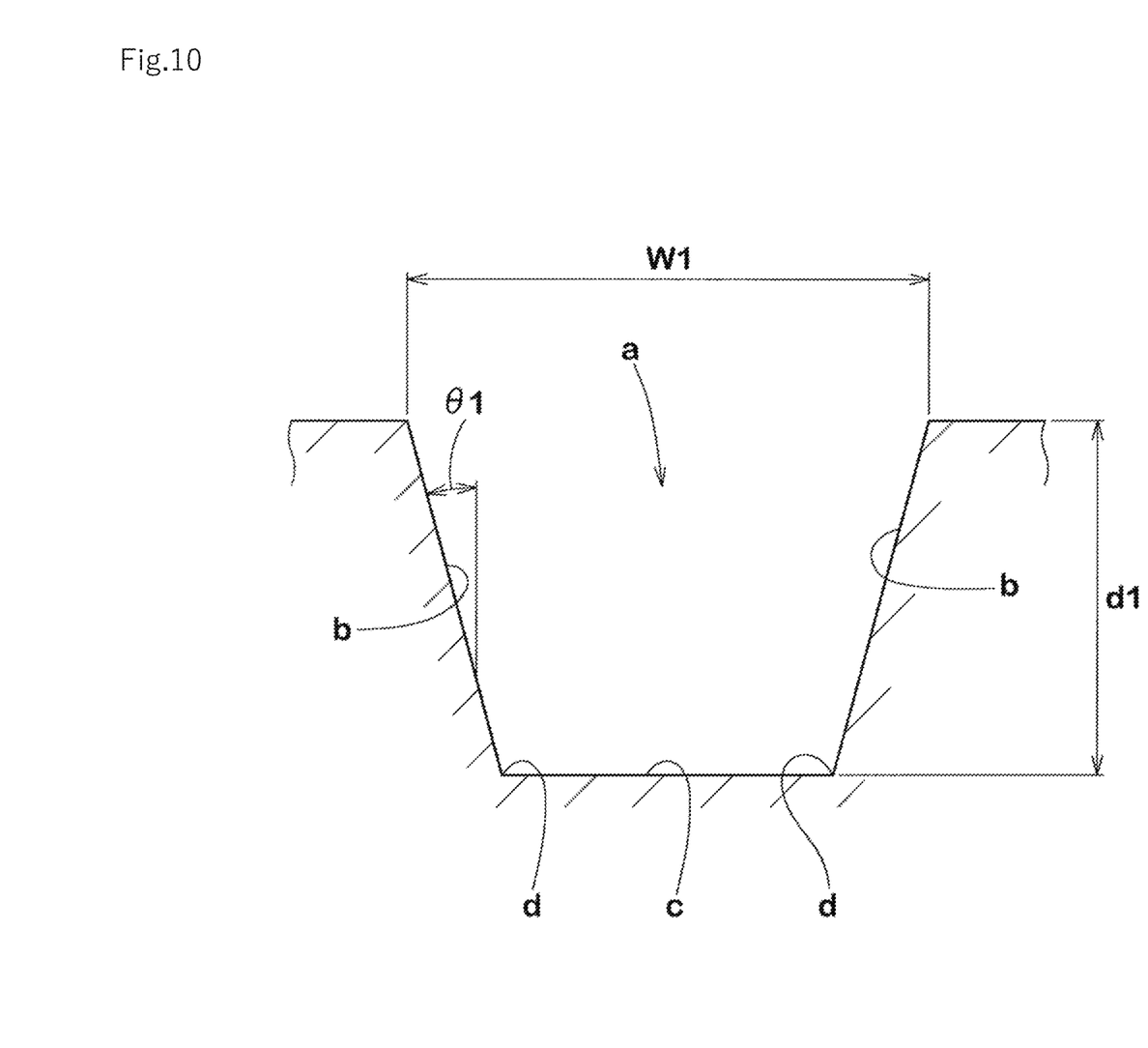
FIG. 10 is a cross-sectional view of a recess of a tire vulcanization mold according to a comparative example.

Cross-sectional view of recess: FIG. 10
Opening width W1 of recess=0.30 mm
Depth d1 of recess=0.30 mm
Angle θ1 of side wall surface of recess=15°

Example 1

Cross-sectional view of recess: FIG. 4
Opening width W1 of recess=0.30 mm
Depth d1 of recess=0.30 mm
Angle θ1 of side wall surface of recess=15°
Height h1 of bottom projection=0.013 mm
Radius of curvature r1 of arc-shaped surface of side wall surface=0.010 mm
Radius of curvature r2 of arc-shaped curve of bottom projection side wall surface=0.010 mm Example 2

Cross-sectional view of recess: FIG. 5
Opening width W1 of recess=0.35 mm
Angle θ1 of side wall surface of recess=22.5°

Example 3

Cross-sectional view of recess: FIG. 6
Opening width W1 of recess=0.40 mm
Angle θ1 of side wall surface of recess=30°
It should be noted that the dimensions of Examples 2 and 3 other than the abovementioned dimensions are the same as those of Example 1.

A plurality of tires were produced using the tire vulcanization molds of the comparative example and Examples 1 to 3 without cleaning the molds in the middle of production, and the degree of blackness L* of the decorative region of each tire was measured using a color difference meter. The degree of blackness L* was measured in accordance with lightness defined in JIS Z8721. The smaller the degree of blackness L*, the lower the lightness of black, which is more preferable for the decorative region of a tire.

Figure 11:
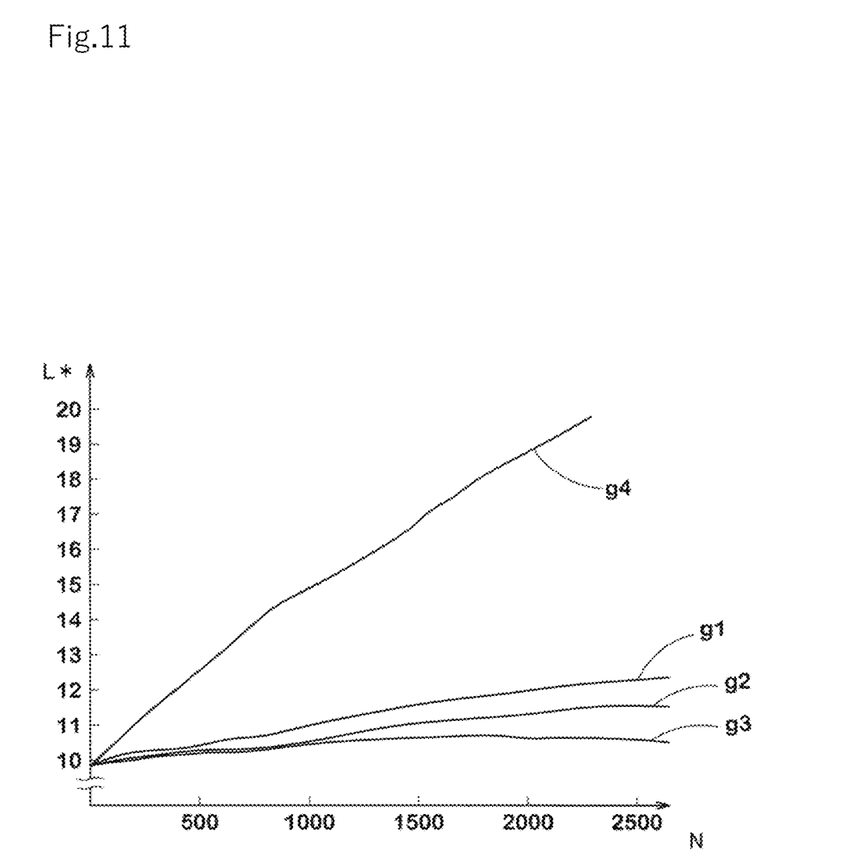
FIG. 11 is a graph showing a relationship between the number N of produced tires and the degree of blackness L* in the comparative example and Examples 1 to 3.

FIG. 11 shows a relationship between the number N of produced tires and the degree of blackness L* in the comparative example and Examples 1 to 3. In FIG. 11, graphs g1 to g3 correspond to Examples 1 to 3, and a graph g4 corresponds to the comparative example.

As shown in FIG. 11, in the comparative example and Examples 1 to 3, as the number N of produced tires increases, the degree of blackness L* becomes worse (the value increases). This is because dirt is accumulated in the recesses of a vulcanization mold. As can be seen from FIG. 11, the rate of deterioration of the degree of blackness L* is significantly lower in Examples 1 to 3 that that in the comparative example. For example, it was confirmed that in the case where the acceptable value of the degree of blackness L* was set to 14, only about 800 tires were produced in the comparative example, but at least three times as many tires as in the comparative example were produced in Examples 1 to 3. Thus, it is verified that the tire vulcanization mold according to the present disclosure can significantly suppress accumulation of dirt in the recesses.

[Additional Note]

The present disclosure includes the following embodiments.

[Present Disclosure 1]

A tire vulcanization mold comprising:
a molding surface for molding a tire during vulcanization molding, wherein
the molding surface includes a first region in which a plurality of recesses for forming a plurality of projections on a surface of the tire are provided,
in the first region, at least two of the recesses are arranged per $mm^2$,
each of the recesses includes a side wall surface, a bottom surface, and a virtual recess central axis extending in a depth direction of the recess, and
in a cross-sectional view of the recess including the recess central axis,
the bottom surface includes a bottom projection projecting outward in the depth direction, and
the side wall surface includes an arc-shaped surface smoothly connected to the bottom surface.

[Present Disclosure 2]

The tire vulcanization mold according to Present Disclosure 1, wherein
in the cross-sectional view,
the bottom projection includes a peak portion located on an outermost side in the depth direction of the recess, and a bottom projection side wall surface extending from the peak portion inward in the depth direction of the recess, and
the bottom projection side wall surface is an arc-shaped curve that is convex toward the recess central axis.

[Present Disclosure 3]

The tire vulcanization mold according to Present Disclosure 2, wherein a radius of curvature of the arc-shaped curve is equal to a radius of curvature of the arc-shaped surface.

[Present Disclosure 4]

The tire vulcanization mold according to any of Present Disclosures 1 to 3, wherein each of the recesses has a shape that is symmetric about the recess central axis.

[Present Disclosure 5]

The tire vulcanization mold according to any of Present Disclosures 1 to 4, wherein
the bottom surface is a region surrounded by a deepest portion in the depth direction of the recess, and
the arc-shaped surface is connected to the deepest portion.

[Present Disclosure 6]

The tire vulcanization mold according to any of Present Disclosures 1 to 5, wherein the bottom surface is composed of the bottom projection.

[Present Disclosure 7]

The tire vulcanization mold according to any of Present Disclosures 1 to 6, wherein the bottom projection has a height of 0.050 to 0.200 mm.

[Present Disclosure 8]

The tire vulcanization mold according to any of Present Disclosures 1 to 7, wherein the arc-shaped surface has a radius of curvature of 0.085 to 0.115 mm.

[Present Disclosure 9]

A method for producing a tire, comprising vulcanizing and molding the tire using the tire vulcanization mold according to any of Present Disclosures 1 to 8.

[Present Disclosure 10]

A tire vulcanized and molded using the tire vulcanization mold according to any of Present Disclosures 1 to 8.

[Present Disclosure 11]

A tire wherein
an outer surface of the tire includes a decorative region in which a plurality of micro projections are provided,
each of the micro projections includes a side surface, a projection peak portion, and a virtual micro projection central axis, and
in a cross-sectional view of the micro projection including the micro projection central axis,
the projection peak portion includes a peak recess that is recessed inward in a height direction of the micro projection, and
the side surface includes an arc-shaped surface smoothly connected to the projection peak portion.

What is claimed is:

1. A tire vulcanization mold comprising:
a molding surface for molding a tire during vulcanization molding, wherein
the molding surface includes a first region in which a plurality of recesses for forming a plurality of projections on a surface of the tire are provided,
in the first region, at least two of the recesses are arranged per $mm^2$,
each of the recesses includes a side wall surface, a bottom surface, and a virtual recess central axis extending in a depth direction of the recess, and in a side cross-sectional view of each of the recesses including the virtual recess central axis:
the bottom surface of the recess includes only one bottom projection projecting outward in the depth direction of the recess, and
the side wall surface of the recess includes an arc-shaped surface smoothly connected to the bottom surface of the recess.

2. The tire vulcanization mold according to claim 1, wherein in the side cross-sectional view,
the only one bottom projection includes a peak portion located on an outermost side in the depth direction of the recess, and a bottom projection side wall surface extending from the peak portion inward in the depth direction of the recess, and
the bottom projection side wall surface is an arc-shaped curve that is convex toward the recess central axis.

3. The tire vulcanization mold according to claim 2, wherein a radius of curvature of the arc-shaped curve is equal to a radius of curvature of the arc-shaped surface.

4. The tire vulcanization mold according to claim 1, wherein each of the recesses has a shape that is symmetric about the recess central axis.

5. The tire vulcanization mold according to claim 1, wherein
the bottom surface is a region surrounded by a deepest portion in the depth direction of the recess, and
the arc-shaped surface is connected to the deepest portion.

6. The tire vulcanization mold according to claim 1, wherein the bottom surface is composed of the bottom projection.

7. The tire vulcanization mold according to claim 1, wherein the bottom projection has a height of 0.050 to 0.200 mm.

8. The tire vulcanization mold according to claim 1, wherein the arc-shaped surface has a radius of curvature of 0.085 to 0.115 mm.

9. A method for producing a tire, comprising vulcanizing and molding the tire using the tire vulcanization mold according to claim 1.

10. A tire vulcanized and molded using the tire vulcanization mold according to claim 1.

11. A tire wherein
an outer surface of the tire includes a decorative region in which a plurality of micro projections are provided,
each of the micro projections includes a side surface, a projection peak portion, and a virtual micro projection central axis, and
in a side cross-sectional view of each of the micro projections including the micro projection central axis:
the projection peak portion of the micro projection includes only one peak recess that is recessed inward in a height direction of the micro projection, and
the side surface of the micro projection includes an arc-shaped surface smoothly connected to the projection peak portion of the micro projection.

12. The tire vulcanization mold according to claim 1, wherein, for each of the recesses, a height of the bottom projection is less than an overall depth of the recess.

13. The tire vulcanization mold according to claim 1, wherein the height of the bottom projection is from 0.010 mm to 0.200 mm, and the overall depth of the recess is from 0.25 mm to 0.50 mm.

14. The tire vulcanization mold according to claim 1, wherein, for each of the recesses, an angle of the sidewall surface with respect to the depth direction is from 5 degrees to 35 degrees.

* * * * *